United States Patent
Yorwarth

(10) Patent No.: US 6,352,232 B1
(45) Date of Patent: Mar. 5, 2002

(54) SECURING SPACED ELEMENTS TO ONE ANOTHER

(75) Inventor: Graeme J. Yorwarth, Essex (GB)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/435,402

(22) Filed: Nov. 6, 1999

(30) Foreign Application Priority Data

Nov. 7, 1998 (GB) .............................................. 9824341

(51) Int. Cl.⁷ ................................................. F16M 1/00
(52) U.S. Cl. ..................................................... 248/650
(58) Field of Search ............................. 248/656, 188.4, 248/678, 544; 411/339, 384

(56) References Cited

U.S. PATENT DOCUMENTS

| | | | | |
|---|---|---|---|---|
| 2,940,784 A | * | 6/1960 | Fell .............................. | 248/650 |
| 3,424,413 A | * | 1/1969 | Applegate .................. | 248/661 |
| 3,669,393 A | * | 6/1972 | Paine et al. ............... | 248/188.4 |
| 3,971,537 A | * | 7/1976 | Winkle et al. ................ | 248/23 |
| 4,108,407 A | | 8/1978 | Cable ........................... | 248/23 |
| 5,340,258 A | * | 8/1994 | Simon ......................... | 411/535 |

FOREIGN PATENT DOCUMENTS

GB 1010013 11/1965

* cited by examiner

*Primary Examiner*—Ramon O. Ramirez
*Assistant Examiner*—Gwendolyn Baxter
(74) *Attorney, Agent, or Firm*—Larry W. Miller; John William Stader

(57) ABSTRACT

A method is disclosed for bolting to one another two structural elements 12, 14 while maintaining a spacing G between the two elements. The method comprises forming a through bore 24 in a first element 14, placing an annular bush 22 within the bore 24 of the first element 14 to project from the first element 14 into contact with the surface of the second element, locking the bush 22 in relation to the bore in the first element 14 and securing the structural elements to one another by means of a bolt 18 passing through the annular bush.

8 Claims, 1 Drawing Sheet

SECURING SPACED ELEMENTS TO ONE ANOTHER

BACKGROUND OF THE INVENTION

The present invention relates to a method and apparatus for securing to one another two structural elements while maintaining a gap between them and, more specifically, to an apparatus for fastening the oil pan to the engine block of a tractor.

It is common to use so-called structural engines in agricultural vehicles, such as tractors, where the engine block forms part of the unsprung mass (or chassis) of the vehicle and is relied upon to assure the structural rigidity of the tractor. To increase the rigidity of such an engine, it is known to secure a substantial oil pan to the underside of the engine block. The oil pan is not only secured to the engine block to collect the lubricating oil circulating through the engine but also acts as a structural element onto which other elements of the tractor chassis such as the front support or the transmission are bolted.

In this situation, because of tolerance stack-up in the manufacture of the engine block, the oil pan and the front support, it is not possible to ensure that the rear face of the front support will always simultaneously lie flush with both the front face of the engine block and the front face of the oil pan. These three elements are therefore intentionally dimensioned such that a gap will always be present between the front support and the oil pan, though the size of the gap may vary from one engine to another.

Conventionally, this gap is taken up by the use of shims, i.e. thin metal spacers that are sandwiched in the gap between the front support and the oil pan before these two are bolted to one another. It is important to select shims of the correct thickness to take up the gap but it is found in practice that incorrect shims are sometimes selected and this results in damage because of the increased stress placed on the elements. It is also time consuming to select and mount the shims and this adds to the manufacturing costs.

In U.S. Pat. No. 4,108,407, an adjustment device is shown in which the use of shims is avoided by providing an externally threaded adjustment member projecting from a bore in a support member. The adjustment member is turned until the gap between the support and a slightly offset tool assembly is taken up, whereafter the adjustment member is locked in place by a locking nut. To secure the support and the tool assembly together, a screw is inserted through a central bore in the adjustment member and tightened with a predetermined torque. In practice, it is not only found that such a system is expensive to manufacture but also that it is time consuming to properly adjust the adjustment member.

The present invention therefore seeks to provide a method and the means of bolting elements to one another while maintaining a spacing between them, which dispenses with the use of shims or threaded adjustment devices and allows simple, swift and reliable bolting of the elements to one another.

SUMMARY OF THE INVENTION

In accordance with a first aspect of the present invention, there is provided a method of bolting to one another two structural elements while maintaining a spacing between the two elements.

The method is characterized in that it comprises the steps of:

forming a through bore in a first element;
 placing a sliding annular bush within the bore of the first element to project from the first element into contact with the surface of the second element;
 locking the bush in relation to the bore in the first element; and
 securing the structural elements to one another by means of a bolt passing through the annular bush.

The steps of the method need not be carried out in the above sequence as it is possible to lock the bush to the bore after securing the structural elements to one another. In a preferred embodiment of the invention, the bush is slidable in the bore in the first element and is locked relative to the bore by means of an anaerobic adhesive.

It is alternatively possible for the bush to be a shrink-fit in the bore. In this case, the bush would be an interference fit when the temperature of the bush is the same as that of the bore but it would be slidable in the bore when it is significantly colder, for example if it is submerged in liquid nitrogen prior to assembly.

As an alternative to the use of an anaerobic adhesive, the bush may be mechanically locked in place. This can be achieved by the use of a pinch bolt or by the use of one or more sliding wedges that expand the diameter of the bush during assembly.

It is advantageous to knurl the outer surface of the bush and to case harden it so that it should remain in place during the setting of the adhesive.

It has been found that anaerobic adhesives that are currently commercially available, such as Loctite RC640, can achieve a permanent joint between the bush and the bore capable of withstanding the forces on the bush during normal operation of the structural elements.

In accordance with a second aspect of the present invention, there is provided an assembly comprising a first, a second and a third element, each element being secured to the other two elements, the first element mating flush with the face of the third element but there being a gap of indeterminate width between the surfaces of the first and second elements.

The assembly is characterized in that the first element is secured to the second element while maintaining the spacing between the first and second elements by means of a bolt passing through a sliding annular bush adjustably received in a bore in the first element, the bush being locked relative to the bore after it has been positioned to bridge the gap between the first and second elements.

The invention will be described below with reference to an embodiment in which the first element is a front support of an agricultural tractor, the second element is an oil pan and the third element is an engine block. It will be appreciated however that the invention can be applied to the bolting together of any two elements that are spaced apart when it is desired not to close the gap between the elements.

BRIEF DESCRIPTION OF THE DRAWINGS

The advantages of this invention will become apparent upon consideration of the following detailed disclosure of the invention, especially when taken in conjunction with the accompanying drawing, wherein the drawing is a diagrammatic partial cross-sectional view of a tractor front support bolted to the engine block and the oil pan of a structural engine.

DETAILED DESCRIPTION OF THE PREFERRED EMBODIMENT

Figure 1:
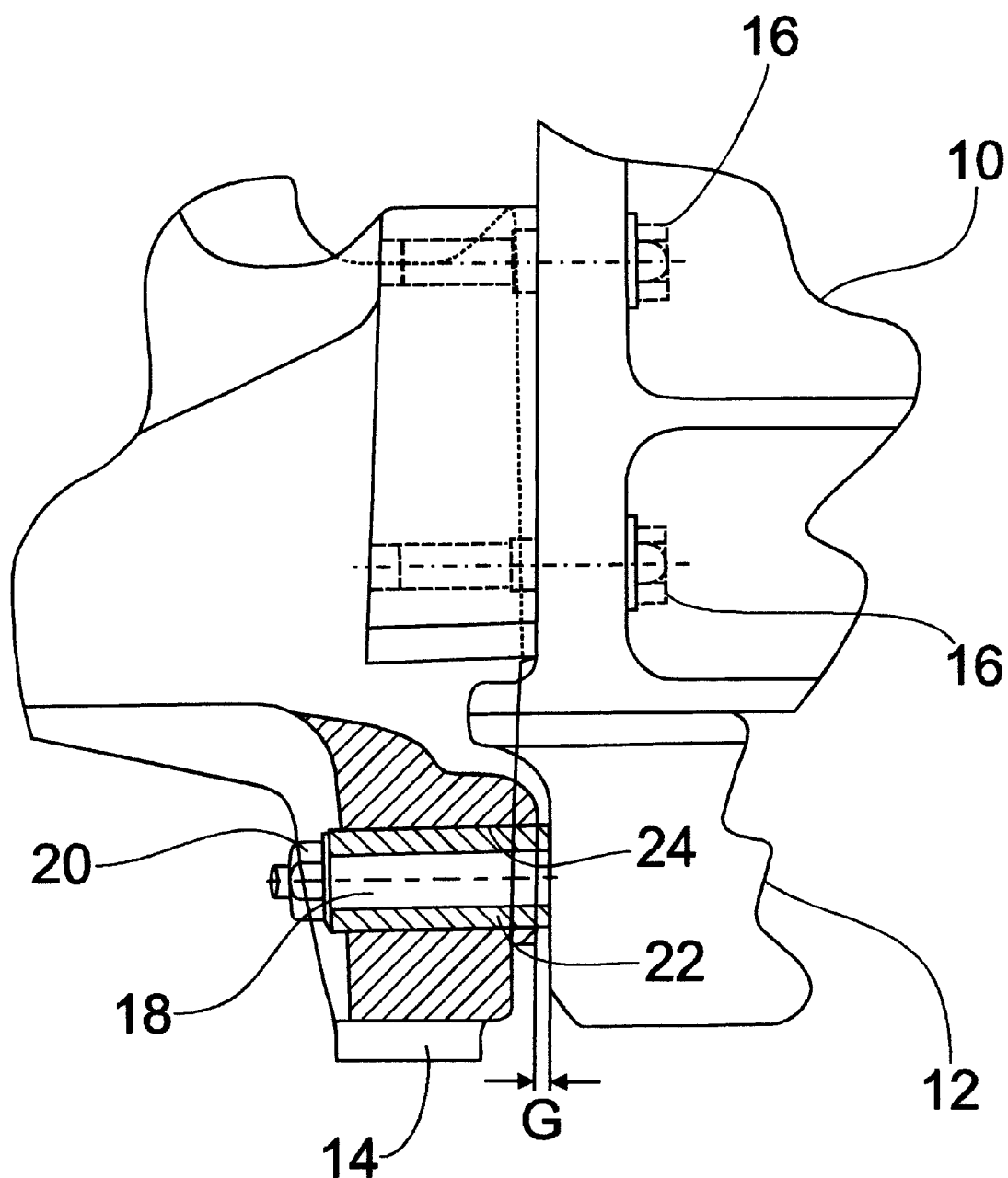

The single FIGURE shows schematically a structural engine, having an engine block 10 and an oil pan 12, bolted to a front support 14. The engine forms part of the chassis of a tractor and the front support 14 is the forward continuation of the chassis on which are mounted, inter alia, the front wheels and their steering mechanism.

The rear face of the front support 14 is flush with the engine block 10 and is bolted to it by means of bolts 16. When the bolts 16 are tightened, the rear face of the front support 14 is not however flush with the front face of the oil pan 12 because of tolerance stackup on the sizes of the three elements 10, 12 and 14. Instead, there is a gap G between the oil pan 12 and the front support 14, the gap G ranging in size from e.g. 0.07 mm to 1.87 mm. This gap G must not be closed when the two elements 12 and 14 are bolted together, as this would stress all three elements.

Conventionally, the gap G is measured and shims are placed between the front support 14 and the oil pan 12 before they are bolted to one another. In practice, however, it is easy to use shims of the incorrect size resulting in fracture of one of the elements that are bolted to one another. It will of course be appreciated that there are numerous other examples of situations where shims are needed to position one element while bolting it to another and the invention is not restricted to its use in attaching a front support to a structural engine of a tractor.

To avoid the use of shims, a case hardened bush 22 with a knurled outer surface is driven into a bore 24 in the front support 14 and the bolt 18, used to secure the oil pan 12 to the front support 14, passes through the bush 22. The bush 22 is smeared with an anaerobic adhesive such as Loctite RC640 before it is inserted in the bore 24 in the front support 14. When a nut 20 is tightened on to the bolt 18, the bush 22 slides along the bore 24 until it meets the front face of the oil pan 12 and bridges the gap G. When the anaerobic adhesive sets, the bush 22 becomes, for all intents and purposes, solid with front support 14. In this way, a secure mounting of the front support 14 to the engine is achieved without the use of shims, the projecting end of the bush 22 being relied upon to take up the gap G between the front support 14 and the oil pan 12.

It will be appreciated that the bolt 18 also could be inserted from the side of the front support 14 and could be received in a threaded bore (not shown) in the oil pan 12 instead of co-operating with a nut for tightening the front support 14 to the oil pan 12. The bush need not necessarily be knurled but knurling serves to prevent movement during assembly. The purpose of case hardening the bush is to prevent it from being distorted as it is pressed out of the bore, as such distortion of the bush could damage the bore.

Anaerobic adhesives take some time to set but once they have set they provide a joint that is difficult to break. If the oil pan should ever need to be changed, the production and service oil pans could be of a different size to one another. It would be possible in such an event to remove the bush by using a press once the temperature of the assembly has been raised to between 180° C. and 200° C., as the adhesive breaks down at these temperatures. However, if removal of the bush should prove difficult, then the projecting end of the bush 22 can be ground down and shims used in the conventional manner to take up the gap between the front support 14 and the new oil pan 12.

The setting of anaerobic adhesives is accelerated by the application of heat. It is common in tractor production techniques to heat the chassis after it has been painted in order to harden the paint coating. The anaerobic adhesive will therefore set at the same time as the paint coating is baked without the need to take any special additional steps.

As an alternative to the use of anaerobic adhesives, a bush 22 of a very tight fit within the bore 24 may be used, which is shrink-fit in situ. In this embodiment, prior to assembly, the bush 22 is cooled to $-195°$ C. within a reservoir of liquid nitrogen. As a result, the bush 22 is sufficiently contracted to allow assembly into the bore 24 and over the bolt 18. The nut 20 is tightened, to a lower torque, proportional to the coefficient of linear expansion of the bush material and the degree of cooling. By tightening the nut 20, the bush 22 is pushed out of the bore 24 and pressed against the front face of the oil pan 12, thereby bridging the gap G between the front support 14 and the oil pan 12. As the temperature of the bush rises, it expands, ensuring a very tight fit within the bore 24. The bush expansion at the same time produces the correct pre-load on the bolt 18 for tightening the front support 14 to the oil pan 12.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A method of bolting to one another first and second structural elements while maintaining a spacing between the two elements, comprising the steps of:

forming a smooth, non-threaded through bore in said first element;

placing a sliding annular bush within the bore of the first element;

inserting a bolt from said second element through said annular bush;

tightening a nut located on said bolt, thereby sliding said bush into engagement with said second support and forming a secure mounting of said first support to said second support while maintaining said spacing between said first and second elements; and locking the bush in relation to the bore in the first element by immersing said bush in liquid nitrogen to shrink said bush prior to placing said bush into said bore.

2. The method of claim 1, wherein the step of locking the bush further comprises the step of permitting the temperature of said bush to rise and expand said bush to shrink fit said bush within said bore after said tightening step.

3. The method of claim 1 further comprising the step of knurling and case hardening said bush prior to placing said bush within said bore of said first element.

4. An assembly comprising a first element, a second element and a third element, each said element being secured to the other two elements, the first element mating flush with the face of the third element but there being a gap of indeterminate width between the surfaces of the first and second elements, said first element being secured to the second element while maintaining the spacing between the first and second elements by a bolt passing through an annular bush slidably received in a bore formed in the first element, the bush being locked relative to the bore after being positioned to bridge the gap between the first and second elements, said bush having a knurled and case hardened outer surface which is locked relative to the bore by means of an anaerobic adhesive.

5. The assembly according to claim 4, wherein the first element is a front support of an agricultural tractor, the second element is an oil pan and the third element is an engine block.

6. An assembly comprising a first element, a second element and a third element, each said element being secured to the other two elements, the first element mating flush with the face of the third element but there being a gap of indeterminate width between the surfaces of the first and second elements, and characterized in that the first element is secured to the second element while maintaining the spacing between the first and second elements by means of a bolt passing through a sliding annular bush adjustably received in a bore in the first element, the bush being locked relative to the bore after being positioned to bridge the gap between the first and second elements, wherein said bush has a knurled outer surface and is case hardened, said bush being shrunk in size before being inserted into said bore by immersing said bush into liquid nitrogen, said bush becoming locked into said bore by permitting the temperature of said bush to rise to expand said bush to shrink fit said bush within said bore.

7. A method of bolting to one another first and second structural elements while maintaining a spacing between the two elements, comprising the steps of:
   forming a smooth, non-threaded through bore in said first element;
   placing a sliding annular bush within the bore of the first element;
   inserting a bolt from said second element through said annular bush;
   tightening a nut located on said bolt, thereby sliding said bush into engagement with said second support and forming a secure mounting of said first support to said second support while maintaining said spacing between said first and second elements; and
   locking the bush in relation to the bore in the first element by adding an anaerobic adhesive to said bush before placing said bush into said bore and allowing said adhesive to set.

8. The method of claim 7, further comprising the step of knurling and case hardening said bush prior to placing said bush within said bore of said first element.

* * * * *